United States Patent [19]

Wakoh

[11] Patent Number: 5,333,951
[45] Date of Patent: Aug. 2, 1994

[54] ROLL MIXING MACHINE AND METHOD
[75] Inventor: Mitsumi Wakoh, Tokyo, Japan
[73] Assignee: Toyo Sekkei Co., Ltd., Tokyo, Japan
[21] Appl. No.: 978,836
[22] Filed: Nov. 19, 1992
[30] Foreign Application Priority Data Jul. 22, 1992 [JP] Japan .................................. 4-216287

[51] Int. Cl.⁵ .......................... B01F 7/12; B21B 45/02
[52] U.S. Cl. ..................................... 366/71; 425/201;
264/175; 241/167; 15/256.52; 15/256.53;
100/174; 366/309
[58] Field of Search ................. 366/71, 69, 74, 78,
366/76, 309; 83/168; 241/167; 425/201;
264/175; 15/256.53, 256.52; 100/174

[56] References Cited

U.S. PATENT DOCUMENTS

| | | | |
|---|---|---|---|
| 1,876,712 | 9/1932 | Maynard | 374/153 |
| 1,932,200 | 10/1933 | Allen | 366/71 |
| 2,032,073 | 2/1936 | Stevens | 366/71 |
| 2,067,458 | 1/1937 | Nichols | 366/71 |
| 2,954,580 | 10/1960 | Hale et al. | 366/71 |
| 2,959,811 | 11/1960 | Curletti | 425/201 |
| 3,083,404 | 4/1963 | Lund | 366/71 |
| 3,983,813 | 10/1976 | Tani | 15/256.53 |
| 4,019,217 | 4/1977 | Schinke | 15/256.53 |
| 4,170,511 | 10/1979 | Milne | 100/93 RP |
| 4,265,705 | 5/1981 | Pyykkönen | 15/256.53 |
| 4,642,839 | 2/1987 | Urban | 15/256.53 |
| 4,996,913 | 3/1991 | DeChristopher | 366/69 |
| 5,066,364 | 11/1991 | Goodnow et al. | 15/256.53 |

FOREIGN PATENT DOCUMENTS

| 30045 | 6/1982 | Japan . | |
|---|---|---|---|
| 0140227 | 8/1983 | Japan | 366/69 |

Primary Examiner—Robert W. Jenkins
Assistant Examiner—Tony G. Soohoo
Attorney, Agent, or Firm—John E. Toupal; Harold G. Jarcho

[57] ABSTRACT

A mixing machine including a frame; a first roller rotatably supported by the frame; a second roller rotatably supported by the frame in a position parallel to the first roller and closely adjacent thereto so as to facilitate compression of material therebetween; a rotary drive mounted for reciprocating movement on the frame in a direction substantially parallel to the first roller; and a reciprocating drive for producing the reciprocating movement of the rotary drive. Also included is a mixing roller operatively coupled to the rotary drive so as to be rotated thereby, the curling roller including an outer end disposed for movement with the rotary drive means along a path closely adjacent to the first roller and extending between outer and inner surface portions thereof so as to move material on said first roller from the outer portion thereof toward the inner portion thereof.

21 Claims, 4 Drawing Sheets

ROLL MIXING MACHINE AND METHOD

BACKGROUND OF THE INVENTION

This invention relates generally to a roll mixing machine and method and, more particularly, to a machine and method for uniformly and efficiently mixing rubber or synthetic resin material used for injection molding, sheet rolling, film rolling, extrusion molding and the like.

Screw mixing machines are used to mix a resin material with a pigment and other additives. Such machines mix uniformly and without unevenness to efficiently obtain a uniform color. However, in cases where a variety of resin materials in small quantities are individually mixed, cleaning of the interior of the screw mixing machine is time consuming and results in reduced periods of machine usage thereby increasing cost. Conversely, conventional roll mixing machines can be easily cleaned and are well suited for mixing small quantities of various materials. However, the mixing efficiency provided by roll machines is poor compared to screw machines so that roll machines require longer mixing periods to obtain uniform color.

In a roll mixing machine disclosed in Japanese Patent Publication No. 57(1982)-30045, a number or rotary cutters are disposed at axially equal intervals frontwardly of a front roller, and a feed blade is centrally inclined downstream of each rotary cutter. A web-like resin material which has been mixed and wound on the front roller is parted widthwise by the cutters, and the parted web-like resin material is biased toward the central portion of the front roller by the feed blades and fed between front and rear rollers.

However, in the aforementioned roll mixing machine, the split web-like resin material is moved only a short distance toward the central portion of the front roller. Thus, for example, a pigment which is present in the right side edge of the web-like resin material is not mixed into the left side edge during each passage of the web-like resin material between the pair of rolls. For that reason considerable time is required to obtain a uniform dispersion of the resin material.

SUMMARY OF THE INVENTION

The invention is a mixing machine including a frame; a first roller rotatably supported by the frame; a second roller rotatably supported by the frame in a position parallel to the first roller and closely adjacent thereto so as to facilitate compression of material therebetween; a rotary drive mounted for reciprocating movement on the frame in a direction substantially parallel to the first roller; and a reciprocating drive for producing the reciprocating movement of the rotary drive. Also included is a mixing roller operatively coupled to the rotary drive so as to be rotated thereby, the mixing roller including an outer end disposed for movement with the rotary drive means along a path closely adjacent to the first roller and extending between outer and inner surface portions thereof so as to move material on the first roller from the outer portion thereof toward the inner portion thereof. The reciprocating mixing roller induces thorough mixing of material moved between the first and second rollers.

According to one feature of the invention, the mixing roller is a non-cylindrical roller with an inner end having a larger diameter than an outer end thereof. The non-cylindrical roller induces desired curling of a web material passing over the first roller.

According to another feature of the invention, the outer end defines an annular, outwardly projecting lip for engaging material on the first roller. The annular lip facilitates lifting of an outer edge of the web material.

According to yet another feature of the invention, the mixing roller is substantially conical between its inner end and annular lip. The conical shape promotes desirable spiraling of the lifted web.

According to other features of the invention, the mixing roller's path is disposed adjacent to a one half surface portion of the first roller facing opposite to the second roller, the first roller has a substantially horizontal first axis, the mixing roller has a second axis perpendicular to the first axis, and the second axis forms with the vertical an angle of between 15°-25°. These features further enhance mixing efficiency.

According to still another feature of the invention, the rotary drive includes a drive shaft aligned with the second axis; and the mixing roller is rotatably mounted to the drive shaft and axially adjustable thereon. These features facilitate adjustment of the mixing roller relative to the web material.

According to further features of the invention, the rotary drive also includes an auxiliary shaft oriented substantially perpendicular to the drive shaft, a gear assembly rotatably coupling the drive shaft to the auxiliary shaft and an elongated housing rotatably supporting the auxiliary shaft, and the frame includes a plurality of spaced apart support rollers disposed on opposite sides of the elongated housing and engaged therewith. This arrangement facilitates cleaning of the first roller and permits mounting of a rotary drive motor in a location remote from potentially damaging heat near the mixing operation.

In a preferred embodiment, the mixing machine includes a pair of the mixing rollers, one mixing roller having an outer end disposed for movement along a path extending between one outer surface portion of the first roller and an inner surface portion thereof, and another mixing roller having an outer end disposed for movement along a path extending between an outer surface portion of said first roller opposite to the one outer surface portion and an inner surface portion thereof. The provision of plural mixing rollers further enhances mixing efficiency.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
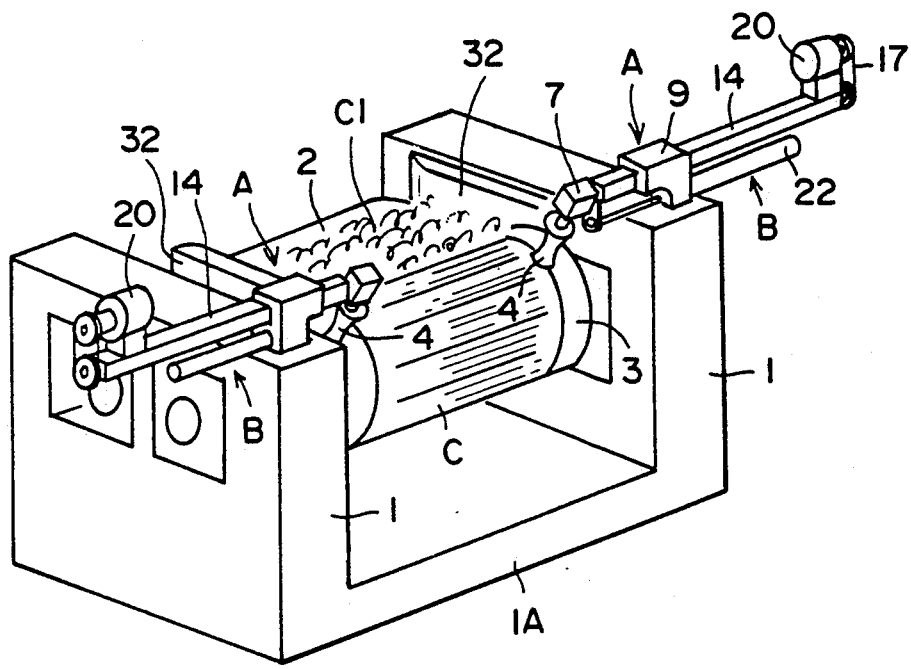
FIG. 1 is a perspective view of a mixing machine according to the present invention.

A roll mixing machine includes parallel front 3 and rear 2 compression rollers rotatably supported between a pair of side frames 1 projecting vertically from sides of a frame base 1A. The first and second compression rollers 3, 2 are driven in opposite directions by an electric motor (not shown). Preferably, the front roller 3 is driven at a peripheral speed about 1.1 to 1.8 times that of the rear roller 2.

Figure 3:
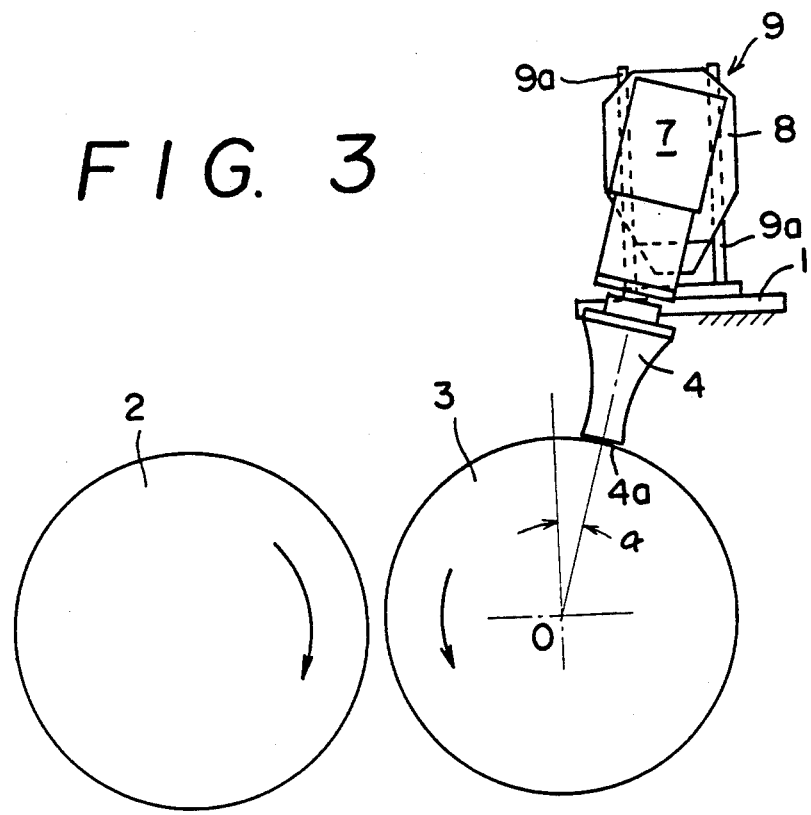
FIG. 3 is a side view illustrating the relationship between compression and mixing rollers used in the machine shown in FIG. 1.

A pair of drive mechanisms A are each supported by a guide frame 9 secured to a forward upper wall portion of each side frame 1. Supported on each guide frame 9 is an elongated, horizontal sliding frame housing 14 reciprocable parallel to the front roller 3 by a fluid-pressure (for example, air pressure) actuator B. A conical mixing roller 4 is supported on an inner end of each sliding frame 14. Each mixing roller 4 is coupled to a drive shaft 28 (FIG. 5) which extends vertically and downwardly from an inner end of one of the sliding frames 14. As shown in FIG. 3, each drive shaft 28 extends downwardly and perpendicularly to a horizontal first axis 0 of the front roller 3 but is inclined frontwardly of the front roller 3 at an angle of inclination $\alpha$ of between 15° to 25° relative to the vertical. Each mixing roller 4 has a free outer end defining an annular, outwardly projecting lip 4a. The lips 4a are disposed adjacent to a front half outer surface of the front roller 3 facing opposite to the back roller 2.

Figure 2:
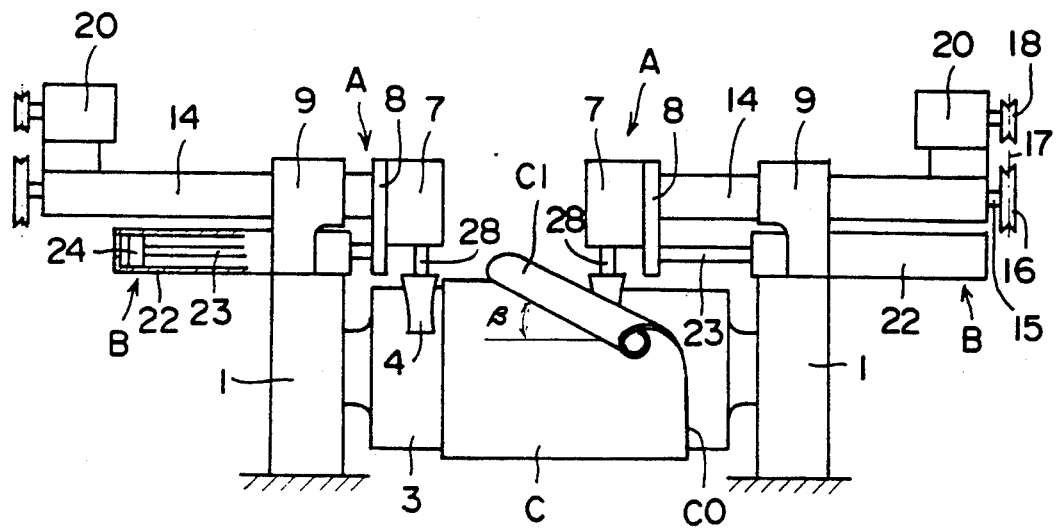
FIG. 2 is a front view of the machine illustrated in FIG. 1.
Figure 5:
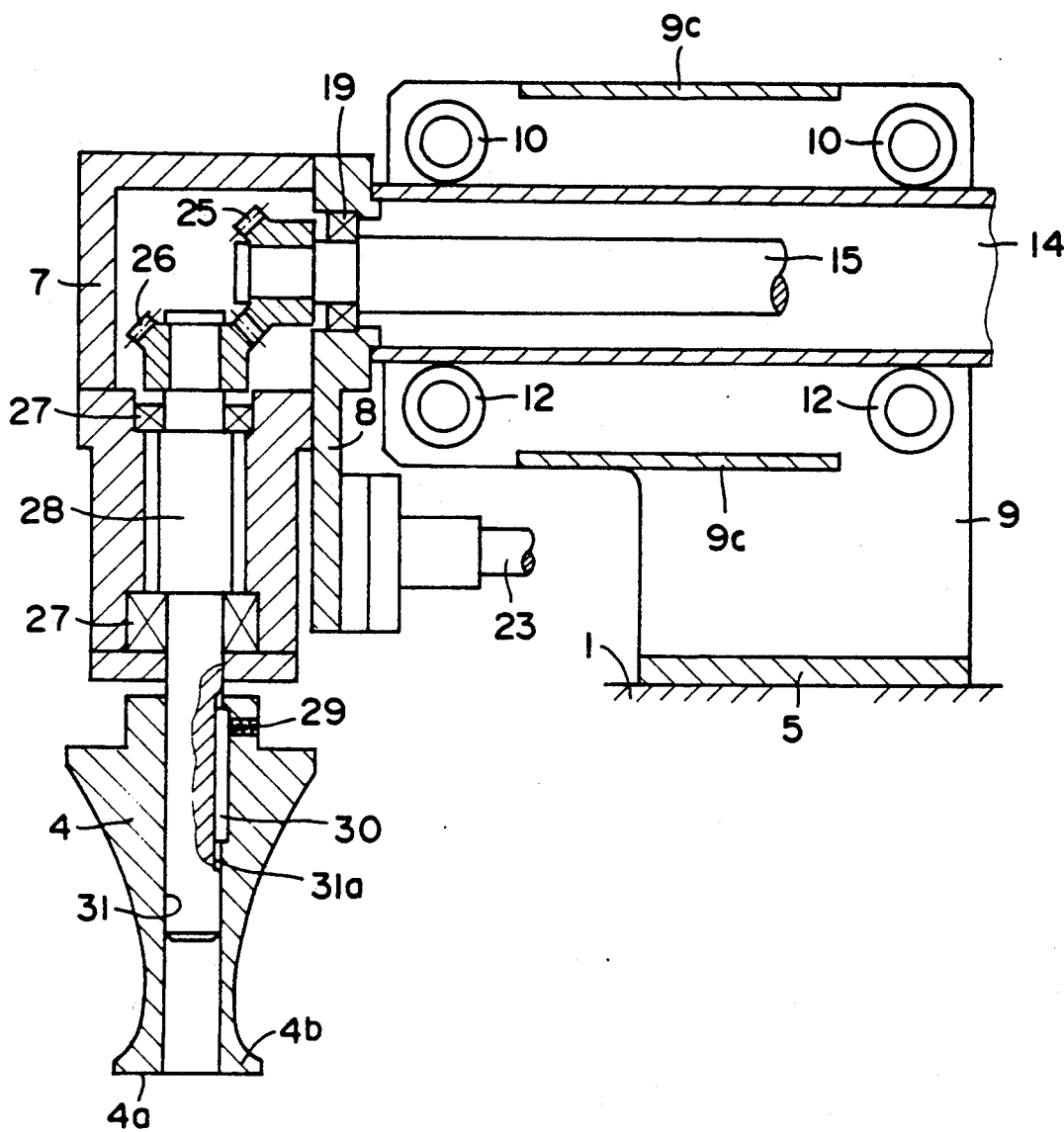
FIG. 5 is a front sectional view of the drive assembly shown in FIG. 4.

As shown in FIG. 5, the drive shaft 28 of each mixing roller 4 is supported by a gear box 7 and is rotatably coupled by a bevel gear mechanism 25, 26 to a perpendicular auxiliary shaft 15 supported interiorly of the sliding housing 14. Each auxiliary shaft 15 is driven via a V belt 17 by an electric motor 20 disposed on an outer end of the sliding housing 14 as shown in FIG. 2. The belts 17 extend between grooved wheels 18 rotatably coupled to shafts of electric motors 20 and grooved wheels 16 coupled to the auxiliary shafts 15.

In each actuator B, a reciprocating drive piston 24 (FIG. 2) is movable within a cylinder 22 coupled to the guide frame 9. Projecting from each piston 24 is a rod 23 connected to a lower end of a connecting plate 8. Each connecting plate 8 is connected between an inner end of a sliding housing 14 and a gear box 7. Thus, each drive mechanism A comprises an integral structure of a guide frame 9, a sliding housing 14 and an actuator B and that integral structure can be retrofitted on the upper wall of a side frame 1 of an existing roll mixing machine. The left and right mixing rollers 4 are each driven by an electric motor 20 and can be reciprocated independently by the actuators B in an axial direction closely adjacent to the front roller 3.

Figure 4:
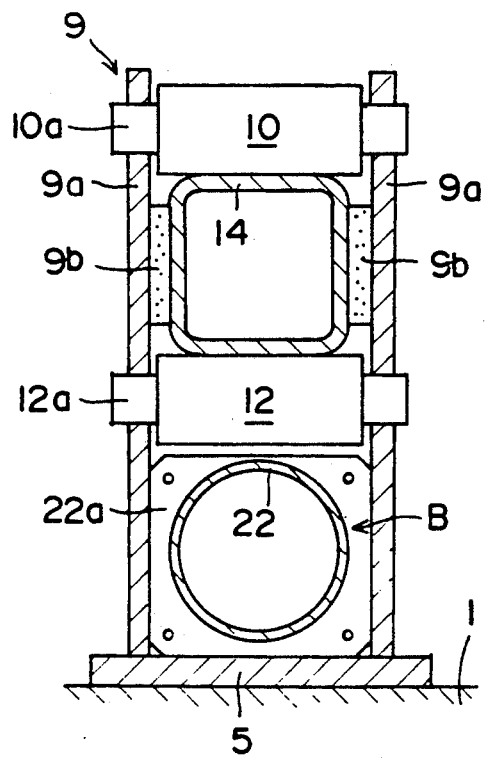
FIG. 4 is a side sectional view of a drive assembly used in the machine shown in FIG. 1.

As shown in FIG. 4, in each guide frame 9, a pair of front and rear frame plates 9a are joined by upper and lower connecting plates 9c (FIG. 5) into a box-shape, and two pairs of upper and lower support rollers 10 and 12 are rotatably supported between the frame plates 9a by, respectively, shafts 10a and 12a. The hollow sliding housing 14 is rectangular in section and upper and lower surfaces thereof are slidably supported between the guide rollers 10 and 12. Guiding movement of the front and rear wall surfaces of each sliding housing 14 are bearing plates 9b supported on inner surfaces of the frame plates 9a. In each actuator B, a flange 22a coupled to a cylinder 22 is joined to a lower half portion of a guide frame 9 in which a base plate 5 is secured to an upper wall of a side frame 1 by means of bolts (not shown).

The inner end of each sliding housing 14 is fixed to a connecting plate 8 and the gear box 7 (FIG. 5), and an end of each auxiliary shaft 15 is supported on a connecting plate 8 by a bearing 19. Each auxiliary shaft 15 extends into the gear box 7 and is coupled to a bevel gear 25. Also extending into each gear box 7 and supported by a pair of upper and lower bearings 27 is one of the drive shafts 28. A bevel gear 26 coupled to an upper end of each drive shaft 28 is meshed with a bevel gear 25 coupled to an auxiliary shaft 15. Engaging each mixing roller 4 with a key way 31a of a drive shaft 28 is a key 30. Each key 30 is locked by a bolt 29 threadedly engaged with a boss to retain an axial position of each mixing roller 4. However, removal of a bolt 29 permits axial adjustment of a mixing roller 4 on a drive shaft 28 to facilitate a desired spacing between an annular lip 46 and the surface of the front roller 3.

OPERATION

A resin material C is mixed between the front roller 3 and rear roller 2 and is wound web-like on the front roller 3 which rotates at a peripheral speed about 1.1 to 1.8 times that of the rear roller 2. The width WO (FIG. 6) of the resin material web C is defined by guide plates 32 (FIGS. 1 and 6) spaced apart above the front roller 3 and the rear roller 2. When the right sliding housing 14 is moved toward the axial central portion of the front roller 3 by the actuator B, the mixing roller 4 also moves along a path extending from an outer surface portion at one end of the front roller 3 to an inner central surface portion thereof as shown. The resin material web C being wound on the front roller 3 has its right edge portion CO lifted and separated from the front roller 3 by the lower end lip 4a (FIG. 5) on the mixing roller 4. Further movement of the mixing roller 4 gathers the web C towards the central portion of the first roller 3. Since the peripheral speed of the mixing roller is about four times faster than that of the front roller 3, the resin material web C is wound up spirally in plural layers at a lead angle B (about 14°) as shown in FIG. 2. When the side edge portion CO (FIG. 6) of the resin material web C is scooped up from the front roller 3 by the mixing roller 4, it is fed at a high speed in an axial direction along the peripheral surface of the mixing roller 4 and then is fed in the direction of rotation of the front roller 3 while being rolled.

Since the mixing roller 4 has a conical shape and is inclined at the angle $\alpha$ of inclination upstream of the front roller 3, the side edge CO of the resin material web C is curled at the same time it is separated from the peripheral surface of the front roller 3. When moving away from the mixing roller 4, the side edge portion CO is curled spirally or cylindrically as indicated by C1 in FIGS. 2 and 6. Subsequently, the spirally or cylindrically wound resin material C1 is loosened and becomes flat while it moves for a short time above the front roller 3 toward the rear roller 2. The wound material C1 then is drawn between the front roller 3 and the rear roller 2 and is compressed and mixed thereby.

When the right mixing roller 4 is reciprocated rightwardly, the left mixing roller 4 also is reciprocated rightwardly along a path extending from the opposite outer end of the front roller 3 toward an inner portion thereof. During that movement, the left roller 4 spirally or cylindrically winds the left edge of the resin material web C as described above and feeds it between the front roller 3 and the rear roller 2. In this manner, mixing and dispersion of the resin material C occurs not only widthwise along the axis of the front roller 3 but also lengthwise in the rotating direction of the front roller 3.

Figure 6:
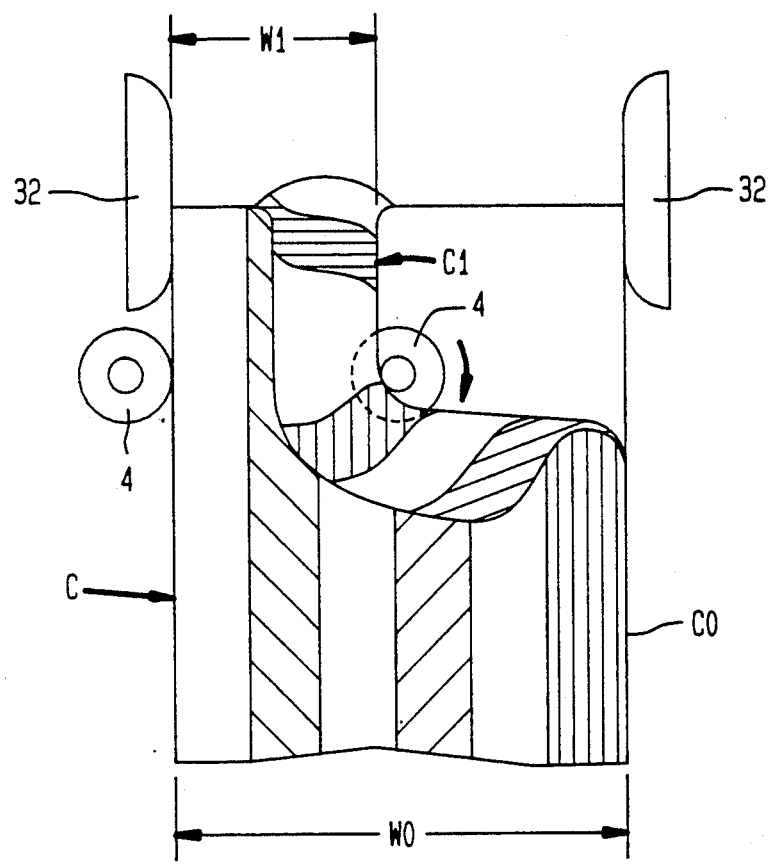
FIG. 6 is a developed plan view explaining operation of the machine shown in FIGS. 1-5.

As shown in FIG. 6, widthwise imaginary stripes S of the resin material web C are spirally wound by the mixing roller 4 and when the wound material C1 of width W1 is drawn between the front roller 3 and the rear roller 2, the strips S obliquely cross each other to promote the widthwise and lengthwise superimposition thereof. As the resin material web C moves between the rollers 2 and 3 it is again compressed to the width WO while being thoroughly mixed. Because each mixing roller 4 has a conical shape with a free outer end small in diameter and an inner end of larger diameter, the side edge portion CO of the resin material web C is fed at high speed as it moves away and upwardly from the surface of the front roller 3, and as a result, the side edge portion Co is spirally wound as shown.

Obviously, many modifications and variations of the present invention are possible in light of the above teachings. It is to be understood, therefore, that the invention can be practiced otherwise than as specifically described.

What is claimed is:
1. A mixing machine comprising:
frame means;
a first roller rotatable on said frame means on a first axis;
a second roller rotatably supported by said frame means in a position parallel to said first roller and closely adjacent thereto so as to facilitate compression of material between said first and second rollers;
rotary drive means mounted for reciprocating movement on said frame means in a direction substantially parallel to said first roller;
reciprocating drive means for producing said reciprocating movement of said rotary drive means on said frame means; and
mixing roller means comprising inner end means operatively coupled to said rotary drive means so as to be rotated by said rotary drive means on a second axis, said mixing roller means further comprising free outer end means mounted for reciprocating movement along a path closely adjacent and parallel to said first roller, said path extending between longitudinally spaced apart outer and inner surface portions of said first roller such that said rotating and reciprocating movement of said mixing roller moves material on said first roller from said outer surface portion thereof toward said inner surface portion thereof.

2. A mixing machine according to claim 1 wherein said mixing roller means comprises a roller having axially distributed transverse cross sections of varying size diminishing between said inner end means and said outer end means.

3. A mixing machine according to claim 2 wherein said outer end defines an annular, transversely projecting lip for engaging material on said first roller.

4. A mixing machine according to claim 3 wherein said mixing roller is substantially conical between said inner end and said annular lip.

5. A mixing machine according to claim 4 wherein said path is disposed adjacent to a longitudinally extending one half surface portion of said first roller facing opposite to said second roller.

6. A mixing machine according to claim 5 wherein said first axis is substantially horizontal and said second axis is substantially perpendicular to said first axis.

7. A mixing machine according to claim 6 wherein said second axis forms with the vertical an angle of between 15°–25°.

8. A mixing machine according to claim 7 wherein said rotary drive means comprises a drive shaft substantially aligned with said second axis; and said mixing roller is rotatably mounted to said drive shaft and axially adjustable thereon.

9. A mixing machine according to claim 8 wherein said rotary drive means further comprises an auxiliary shaft oriented substantially perpendicular to said drive shaft, and gear means rotatably coupling said drive shaft to said auxiliary shaft.

10. A mixing machine according to claim 9 wherein said rotary drive means further comprises an elongated housing rotatably supporting said auxiliary shaft, and said frame means comprises a plurality of spaced apart support rollers engaging opposite sides of said elongated housing and arranged to accommodate reciprocating movement of said elongated housing.

11. A mixing machine according to claim 1 wherein said mixing roller means comprises a pair of mixing rollers; one said mixing roller having an inner end operatively coupled to said rotary drive means so as to be rotated on said second axis and a free outer end mounted for movement along a first path closely adjacent and parallel to said first roller, said first path extending between a first outer surface portion at one end of said first roller and an inner surface portion of said first roller longitudinally spaced from said first outer surface portion; and another mixing roller having an inner end operatively coupled to said rotary drive means so as to be rotated on a third axis parallel to said second axis and a free outer end disposed for movement along a second path closely adjacent and parallel to said first roller, said second path extending between a second outer surface portion at an opposite end of said first roller and an inner surface portion of said first roller longitudinally spaced from said second outer surface portion.

12. A mixing machine according to claim 11 wherein each said mixing roller comprises a roller having axially distributed transverse cross sections of varying size diminishing between said inner end means and said outer end means.

13. A mixing machine according to claim 12 wherein each said outer end defines an annular, transversely projecting lip for engaging material on said first roller.

14. A mixing machine according to claim 13 wherein each said mixing roller is substantially conical between said inner end and said annular lip.

15. A mixing machine according to claim 14 wherein each said path is disposed adjacent to a longitudinally extending one half portion of said first roller facing opposite to said second roller.

16. A mixing machine according to claim 15 wherein said first axis is substantially horizontal and each said second axis and said third axis is substantially perpendicular to said first axis.

17. A mixing machine according to claim 16 wherein said second axis forms with the vertical an angle of between 15°–25°.

18. A mixing machine according to claim 17 wherein said rotary drive means comprises a pair of drive shafts each substantially aligned with one of said first axes, and each said mixing roller is rotatably mounted to one of said drive shafts and axially adjustable thereon.

19. A mixing machine according to claim 18 wherein said rotary drive means further comprises a pair of auxiliary shafts, one oriented substantially perpendicular to each said drive shaft, and gear means rotatably coupling drive shafts to said auxiliary shafts.

20. A method for mixing material comprising the steps of:
   providing a pair of parallel, closely adjacent compression rollers;
   rotating said compression rollers in opposite directions;
   compressing a web of material between said compression rollers;
   providing one rotatable mixing roller with a free outer end disposed adjacent to an outer surface of one of said compression rollers;
   producing rotation of said one mixing roller; and
   reciprocating said free outer end of said rotating mixing roller along the surface of said one compression roller along a path extending between longitudinally spaced apart outer and inner surface portions of said one compression roller, said free outer end of said one mixing roller moving an outer edge of said web in a spiral path between said outer and inner surface portions.

21. A method according to claim 20 including the steps of:
   providing another rotatable mixing roller with a free outer end disposed adjacent to an outer surface of said one compression roller;
   producing rotation of said another mixing roller; and
   reciprocating said free outer end of said another mixing roller along the surface of said one compression roller along a path extending between longitudinally spaced apart outer and inner surface portions of said one compression roller, said free outer end of said another mixing roller moving an outer edge of said web in a spiral path between said outer and inner surface portions; and
   wherein said one and another mixing rollers are simultaneously reciprocated in opposite directions along said surface of said one compression roller.

* * * * *